United States Patent
Biasiotto et al.

(10) Patent No.: US 6,907,968 B2
(45) Date of Patent: Jun. 21, 2005

(54) AUTOMOTIVE SUSPENSION WITH A ROTATIONAL SHOCK-ABSORBER

(75) Inventors: Marco Biasiotto, Turin (IT); Francesco Butera, Turin (IT); Stefano Alacqua, Cascine Vica-Rivoli (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 0 days.

(21) Appl. No.: 10/449,591

(22) Filed: Jun. 2, 2003

(65) Prior Publication Data

US 2004/0007432 A1 Jan. 15, 2004

(30) Foreign Application Priority Data

Jul. 9, 2002 (IT) ..................................... TO2002A0595

(51) Int. Cl.⁷ ................................................. F16F 9/14
(52) U.S. Cl. ..................... 188/306; 188/267.2; 180/227
(58) Field of Search ............................... 188/306–310, 188/267, 267.1, 267.2, 316, 317, 322.22; 267/140.11, 140.14, 140.15; 280/281.1, 283, 285; 180/227

(56) References Cited

U.S. PATENT DOCUMENTS

| | | | | |
|---|---|---|---|---|
| 4,773,514 A | * | 9/1988 | Gustafsson | 188/306 |
| 5,586,780 A | * | 12/1996 | Klein et al. | 280/275 |
| 5,927,740 A | * | 7/1999 | Hopey | 280/272 |
| 6,439,356 B1 | * | 8/2002 | Butera et al. | 188/267.2 |
| 6,494,302 B2 | * | 12/2002 | Gustafsson et al. | 188/307 |

FOREIGN PATENT DOCUMENTS

| EP | 1070872 A1 | * | 1/2001 |
|---|---|---|---|
| EP | 1134100 A2 | * | 9/2001 |

* cited by examiner

Primary Examiner—Pam Rodriguez
(74) Attorney, Agent, or Firm—Sughrue Mion, PLLC

(57) ABSTRACT

A motor-vehicle suspension having oscillating arms, in which one of the arms is formed by the casing of a rotational shock-absorber, wherein the oscillating piston of the shock-absorber is connected to the structure of the motor vehicle. Preferably, the casing of the rotational shock-absorber is also used for the anchorage of a respective end of a leaf spring, which constitutes the elastic element of the suspension.

6 Claims, 4 Drawing Sheets

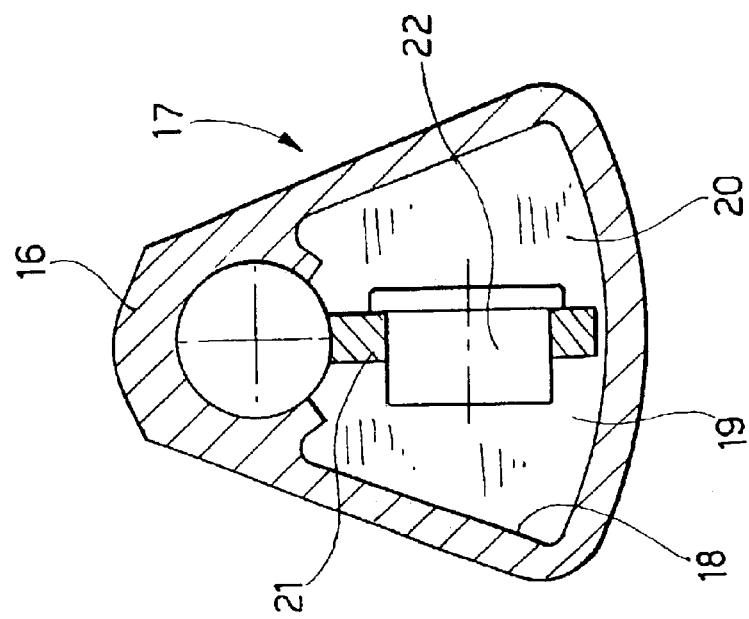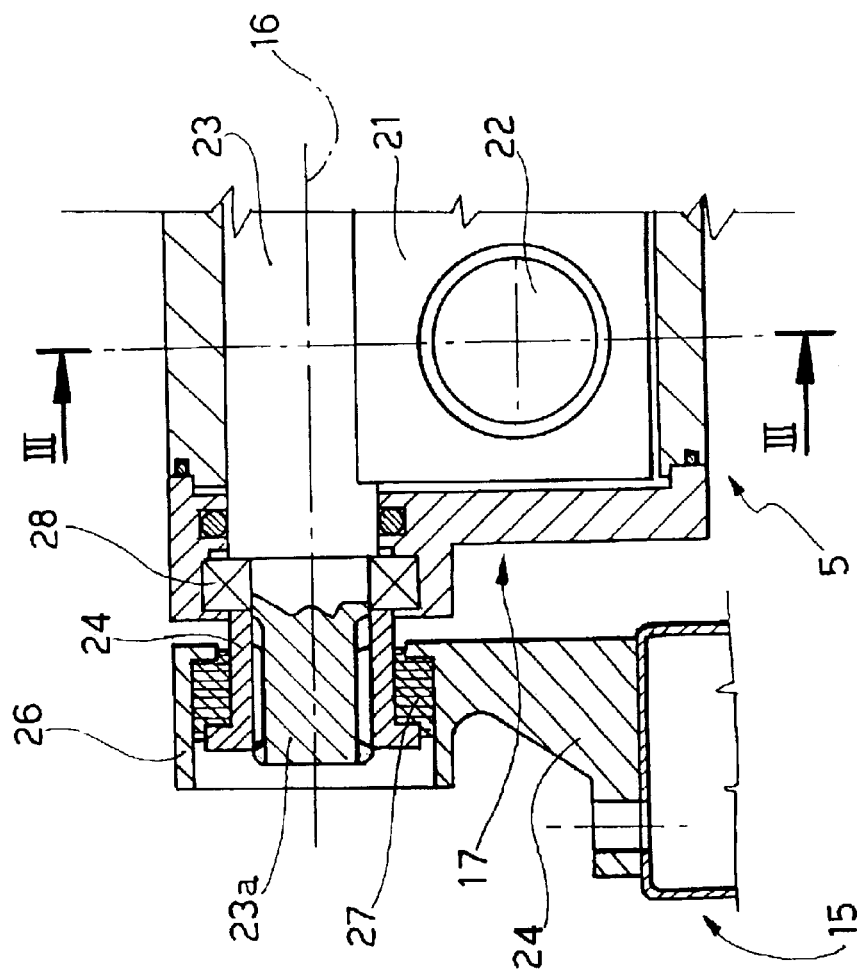

US 6,907,968 B2

AUTOMOTIVE SUSPENSION WITH A ROTATIONAL SHOCK-ABSORBER

BACKGROUND OF THE INVENTION

The present invention relates to an automotive suspension of the type comprising an oscillating connection arm having a first end pivotally connected to the structure of the motor vehicle and a second end pivotally connected to a respective wheel support, and a rotational shock-absorber, which is operatively connected to said oscillating arm and includes a casing and an oscillating-piston element arranged within a cavity of the casing and defining, in said cavity, a first chamber and a second chamber which exchange a fluid through a restricted passage provided on said oscillating piston.

An automotive suspension of the above type is for example described in European Patent Application EP 1 134 100 A2, in the name of the present applicant.

SUMMARY OF THE INVENTION

The purpose of the present invention is to propose an automotive suspension of the type specified above having a structure that is extremely simple and of small overall dimensions and, nevertheless, operating efficiently and reliably.

In order to achieve this purpose, the subject of the invention is an automotive suspension of the type referred to at the start of the present description, characterized in that the aforesaid rotational shock-absorber has its axis of oscillation coinciding with the axis of articulation of the aforesaid first end of the oscillating arm, and in that the oscillating piston of the shock-absorber is connected to the structure of the motor vehicle, whilst the casing of the rotational shock-absorber constitutes the aforesaid oscillating arm.

In a preferred embodiment of the invention, which relates to a suspension with a top oscillating arm and a bottom oscillating arm, which are arranged transversely with respect to the longitudinal direction of the motor vehicle, the casing of the rotational shock-absorber constitutes the top transverse arm.

A further characteristic of the preferred embodiment lies in the fact that the suspension comprises elastic means in the form of a leaf spring set transversely with respect to the longitudinal direction of the motor vehicle, anchored centrally to the structure of the vehicle and having its ends each connected to a respective top transverse arm of the suspension. According to the invention, the casing of the aforesaid rotational shock-absorber is also used for anchorage of the respective end of the aforesaid leaf spring.

BRIEF DESCRIPTION OF THE DRAWINGS

Further characteristics and advantages of the invention will become clearly apparent from the following description with reference to the annexed drawings, which are provided purely by way of non-limiting example and in which:

FIG. 2 is a cross-sectional view according to the line II—II of FIG. 1;

FIG. 3 is a cross-sectional view according to the line III—III of FIG. 2;

DETAILED DESCRIPTION OF THE INVENTION

Figure 4:
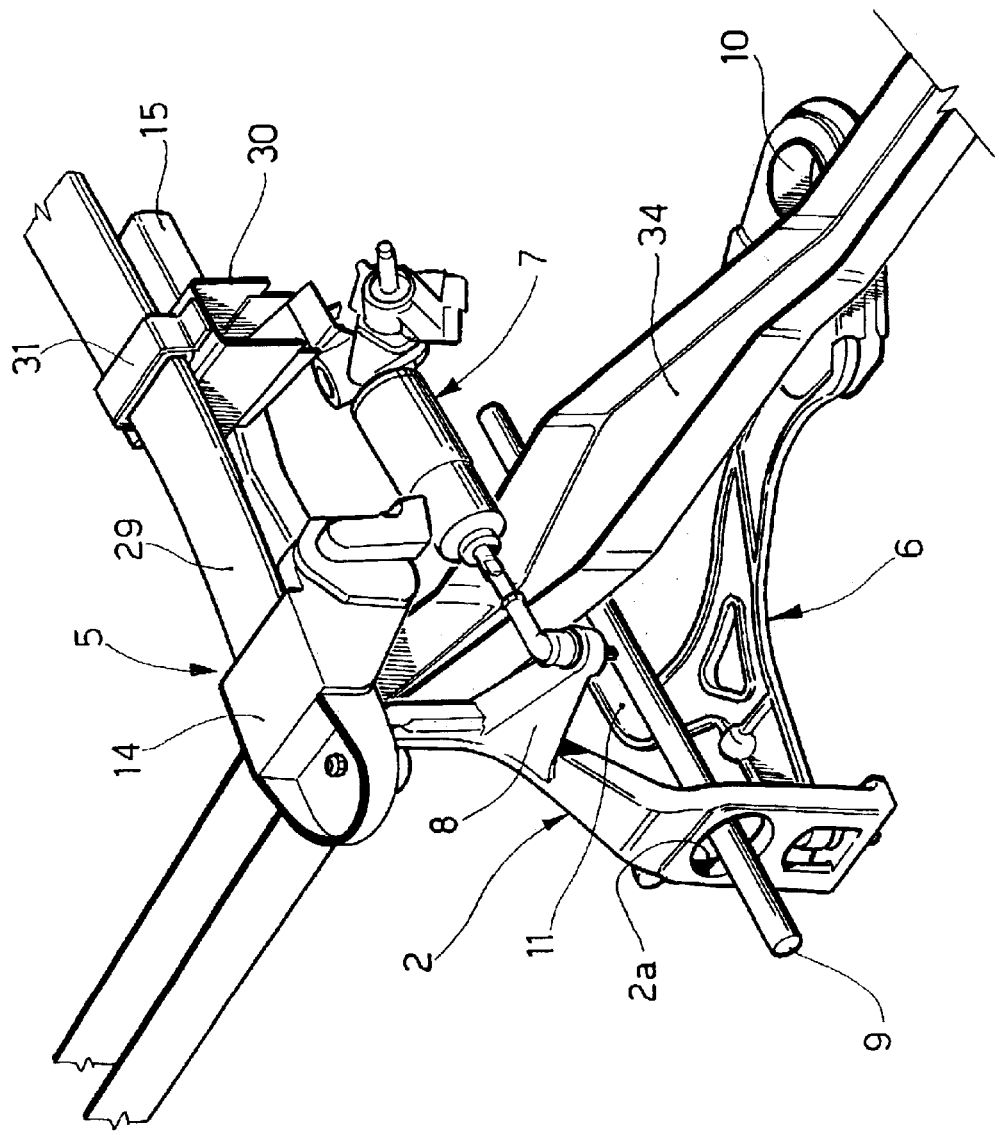
FIG. 4 is a perspective view of the automotive suspension of FIGS. 1–3.
Figure 5:
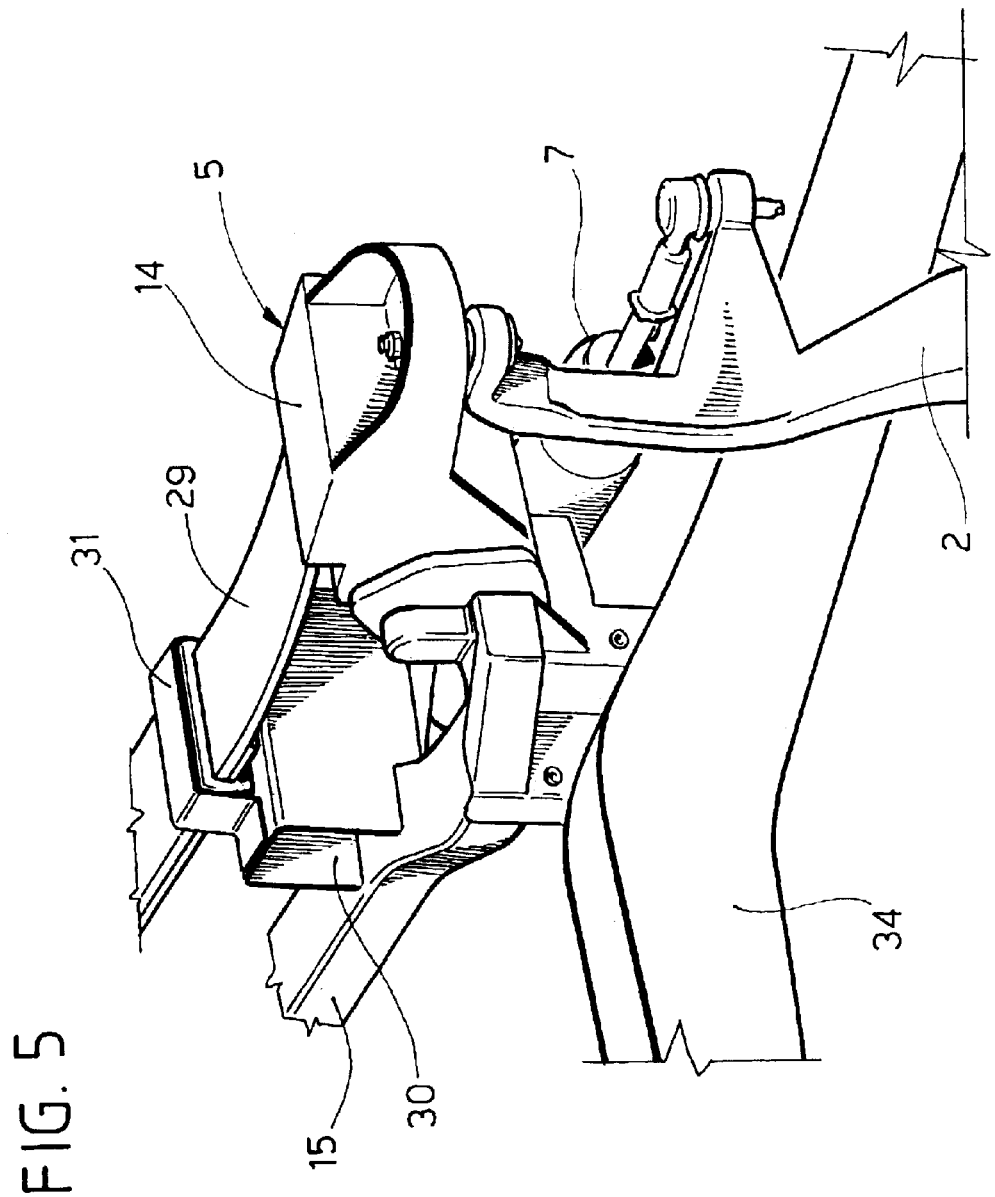
FIG. 5 is a further perspective view.

With reference to the annexed drawings, the reference number 1 generally designates, an automotive suspension for the front steering wheels of the motor vehicle. The figures illustrate only the detail regarding to the right-hand part of the suspension. Fundamentally, the suspension is of the type with transverse oscillating arms, in which a wheel support 2, carrying the wheel (not illustrated) is connected by means of articulated joints 3, 4 to a top oscillating transverse arm 5 and a bottom oscillating transverse arm 6. In the example illustrated, which refers, as has already been mentioned, to a front suspension, the articulated joints 3, 4 enable rotation of the support 2 about the axis that passes through said articulated joints, for the purpose of enabling steering of the motor vehicle. The said steering is controlled by an oversteering device 7 (FIG. 4), the stem of which is connected to an arm 8, which projects radially from the support 2. In the case illustrated, the front steering wheels of the motor vehicle are also drive wheels, and consequently the support 2 presents, in a way in itself known, a partial opening 2a for the passage of an axle shaft 9 of the engine, which is designed to control the rotation of the wheel.

The bottom oscillating arm 6 is made of a substantially triangular steel-plate structure, having a vertex connected to the support 2 in a position corresponding to the articulated joint 4, and two anchoring areas 10, 11, which are connected, in an articulated way, to a structure 12 forming part of the body of the motor vehicle (FIG. 1), about an axis 13.

According to the invention, the top oscillating arm 5 would, instead, be formed by the casing 14 of a rotational shock-absorber or dashpot 17 installed so that it oscillates on one end of a cross member 15, which is rigidly connected to the body of the motor vehicle about an axis 16, which, like the axis 13, is set substantially parallel to the longitudinal direction of the motor vehicle. With reference also to FIGS. 2 and 3, the casing 14 of the shock-absorber 17 constitutes the top oscillating arm of the suspension. According to a technique which is in itself known, the casing 14 defines inside it a cavity 18, which is separated into two chambers 19, 20 by a piston 21 in form of oscillating blade the axis of oscillation of which coincides with the axis 16. On the oscillating-blade piston 21 there are provided means 22, which enable passage of the oil filling the two chambers 19, 20 from one chamber to the other, as a result of the oscillation of the piston 21. Preferably, in accordance with the solution forming the subject of the European patent application EP-A-1 070 872 in the name of the present applicant, instead of oil there may be provided a magneto-rheological fluid for the two chambers 19, 20 of the shock absorber, and the means 22 may include electrical-control means for regulating the resistance of outflow of the fluid traversing the passage that sets in communication the two chambers of the shock-absorber.

Figure 1:
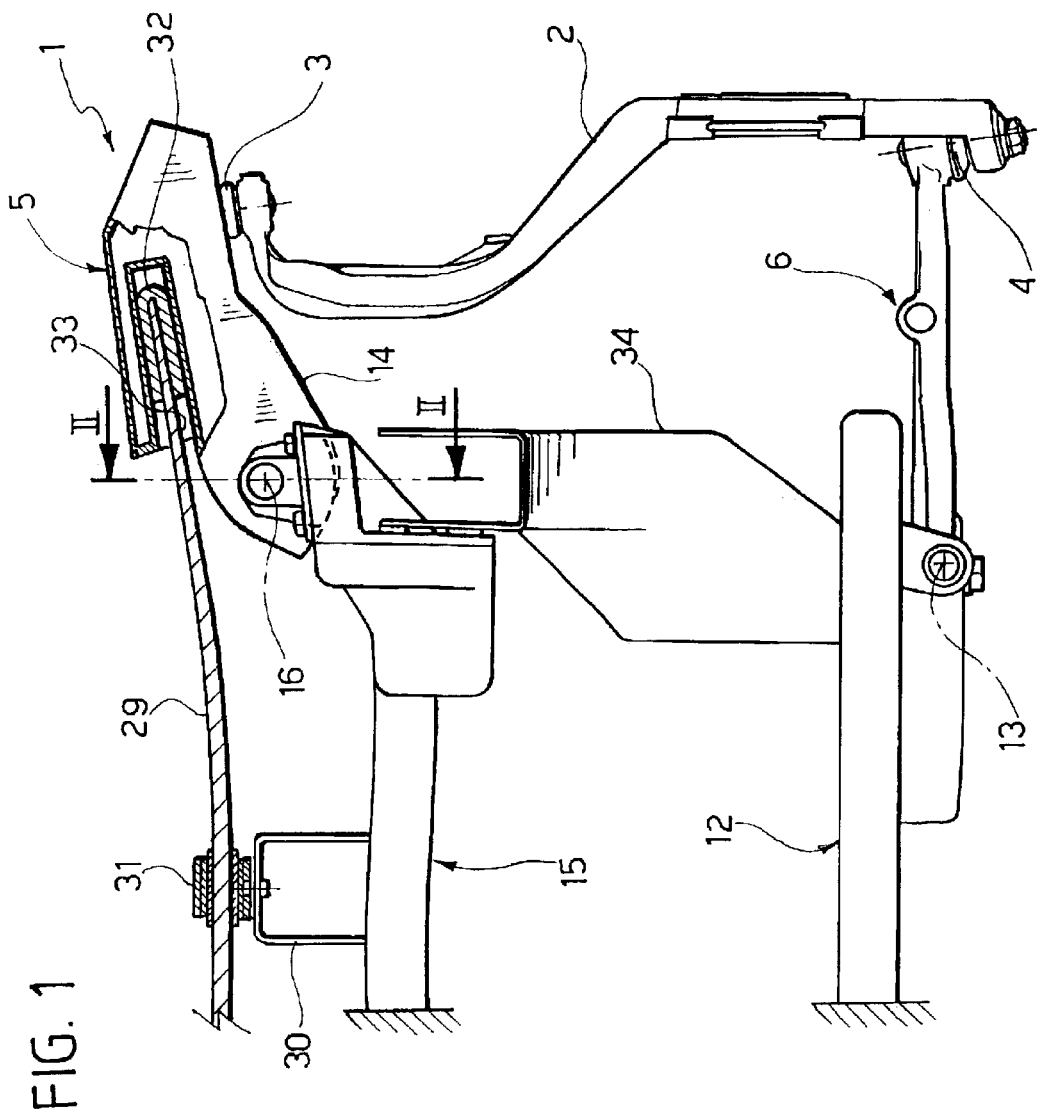
FIG. 1 is a cross-sectional view, in a plane transverse to the longitudinal direction of the motor vehicle, of a preferred embodiment of the automotive suspension according to the invention.

As may be seen again in particular in FIGS. 1 and 2, the oscillating-blade piston 21 is rigidly connected to a shaft 23, which has at least one end connected to a bracket 24, mounted on the fixed cross member 15. In the example illustrated, the shaft 23 has a grooved end portion 23a, which is received within a bushing 24 containing an internal groove. The bushing 24 is in turn carried by a bushing-like portion 26 of the bracket 24, by means of interposition of an elastic annular support 27, which has the purpose of absorbing the minor torsional and axial vibrations transmitted by the shaft. The shaft 23 is moreover supported in rotation inside the casing 14 by means of bearings 28 (only one of which can be seen in the drawing of FIG. 2).

Again with reference to FIG. 1, the suspension in the case of the preferred embodiment, further includes elastic means in the form of a leaf spring 29, which in the example illustrated consists of a single leaf of a leaf spring, anchored centrally to the fixed cross member 15 by means of two brackets 30 (just one of which may be seen in FIG. 1), which are arranged symmetrically with respect to the centre-line longitudinal plane of the motor vehicle, and respective damping clamps 31. Each end of the leaf spring 29 is received, with the interposition of a damping element 32, within a cavity 33 of the casing 14 of the rotational shock-absorber 5, which thus constitutes also the support for the anchorage of the end of the leaf spring.

Of course, the left-hand part of the suspension is identical to, and specular with respect to, the part described above.

The annexed drawings also illustrate a longitudinal member 34, which forms part of the structure of the motor vehicle.

As emerges clearly from the foregoing description, the automotive suspension according to the invention is characterized by having damping means in the form of a rotational shock-absorber or dashpot, the casing of which constitutes an oscillating arm of the suspension. In the preferred embodiment, the casing of the shock-absorber is also used for anchoring the end of a leaf spring which constitutes the elastic element of the suspension.

Of course, without prejudice to the principle of the invention, the details of construction and the embodiments may vary widely with respect to what is described and illustrated herein purely by way of example, without thereby departing from the scope of the present invention.

What is claimed is:

1. An automotive suspension, comprising:
   an oscillating connection arm, which has a first end pivotally connected to the structure of the motor vehicle and the second end pivotally connected to a wheel support;
   a rotational shock-absorber, which is operatively connected to said oscillating arm and has a casing; and
   an oscillating-piston element, which is set within a cavity of the casing and defines in said cavity a first chamber and a second chamber, which exchange with one another a fluid through a restricted passage provided on said oscillating piston,
   wherein said rotational shock-absorber has its axis of oscillation coinciding with the axis of oscillation of the first end of the oscillating arm, in that the aforesaid oscillating piston is connected to the structure of the motor vehicle, and in that the casing of said shock-absorber constitutes the aforesaid oscillating arm.

2. The suspension according to claim 1, wherein said suspension comprises a top oscillating arm and a bottom oscillating arm, which are arranged transversely with respect to the longitudinal direction of the motor vehicle for providing oscillating connection of the wheel support to the structure of the motor vehicle, and in that the casing of said rotational shock-absorber constitutes the aforesaid top oscillating arm.

3. The suspension according to claim 2, wherein the aforesaid oscillating piston is carried by a shaft, which turns within the casing of the rotational shock-absorber, said shaft being connected, at at least one end, to a support, which is rigidly connected to the structure of the motor vehicle.

4. The suspension according to claim 3, wherein said shaft is connected to said support by means of an elastic vibration-damping bushing.

5. The suspension according to claim 1, further comprising elastic means in the form set transversely with respect to the longitudinal direction of the motor vehicle, anchored centrally to the structure of the motor vehicle, and having each of its ends connected to the casing of the respective rotational shock-absorber.

6. The suspension according to claim 1, wherein said rotational shock-absorber uses a magneto-rheological or electro-rheological fluid, and in that said piston is provided with electrical-control means for varying the properties of the fluid.

\* \* \* \* \*